United States Patent
Ojster

(10) Patent No.: US 9,990,579 B2
(45) Date of Patent: Jun. 5, 2018

(54) IC MODULE FOR DIFFERENT CONNECTION TECHNOLOGIES

(71) Applicant: GIESECKE & DEVRIENT GMBH, München (DE)

(72) Inventor: Albert Ojster, Grünwald (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 38 days.

(21) Appl. No.: 15/034,028

(22) PCT Filed: Nov. 3, 2014

(86) PCT No.: PCT/EP2014/002938
§ 371 (c)(1),
(2) Date: May 3, 2016

(87) PCT Pub. No.: WO2015/062742
PCT Pub. Date: May 7, 2015

(65) Prior Publication Data
US 2016/0283838 A1    Sep. 29, 2016

(30) Foreign Application Priority Data

Nov. 4, 2013 (DE) .................. 10 2013 018 518

(51) Int. Cl.
*G06K 19/077* (2006.01)
*G06K 19/07* (2006.01)

(52) U.S. Cl.
CPC ..... *G06K 19/0775* (2013.01); *G06K 19/0723* (2013.01); *G06K 19/07747* (2013.01);
(Continued)

(58) Field of Classification Search
CPC ....... G06K 19/07743; G06K 19/07745; G06K 19/07747; G06K 19/07754; G06K 19/0775; G06K 19/07766; G06K 19/07769
See application file for complete search history.

(56) References Cited

U.S. PATENT DOCUMENTS 6,448,639 B1 * 9/2002 Ma ..................... H01L 23/49816
257/690
6,881,605 B2 * 4/2005 Lee ................... G06K 19/07749
257/679
(Continued)

FOREIGN PATENT DOCUMENTS

CN         103262102 A     8/2013
DE     102012013920 A1     1/2013
(Continued)

OTHER PUBLICATIONS

Machine translation of WO 00/25265, retrieved Aug. 20, 2017, https://worldwide.espacenet.com/publicationDetails/originalDocument?FT=D&date=20000504&DB=EPODOC&locale=en_EP&CC=WO&NR=0025265A1&KC=A1&ND=5#.*
(Continued)

*Primary Examiner* — Suezu Ellis
(74) *Attorney, Agent, or Firm* — Workman Nydegger

(57) ABSTRACT

An IC module for installation in a portable data carrier and for electrical connection with an electronic device located in the data carrier supports at least two different connection technologies. It carries for this purpose contacting elements having a first set of contacting pads for a first connection technology and a second set of contacting solder areas for a second connection technology. A contacting pad of the first set of contacting pads in each case is connected electroconductively to a contacting pad of the second set of contacting pads. The connection can preferably be electively effected
(Continued)

by a pressure-form technology or by means of connection wires as a soldered connection.

15 Claims, 5 Drawing Sheets

(52) U.S. Cl.
CPC . G06K 19/07754 (2013.01); G06K 19/07775 (2013.01); *G06K 19/07749* (2013.01)

(56) References Cited

U.S. PATENT DOCUMENTS

| | | | |
|---|---|---|---|
| 7,331,528 | B2 | 2/2008 | Reid et al. |
| 9,247,643 | B2 | 1/2016 | Droz |
| 9,684,863 | B2 | 6/2017 | Droz |
| 2006/0038022 | A1 | 2/2006 | Reid et al. |
| 2010/0006996 | A1* | 1/2010 | Heres ............... H01L 21/4832 |
| | | | 257/676 |
| 2012/0248201 | A1* | 10/2012 | Sutera .............. G06K 19/07728 |
| | | | 235/492 |
| 2013/0286611 | A1* | 10/2013 | Droz ................ G06K 19/07728 |
| | | | 361/760 |
| 2016/0098628 | A1 | 4/2016 | Droz |

FOREIGN PATENT DOCUMENTS

| | | |
|---|---|---|
| EP | 1654694 B1 | 2/2009 |
| EP | 1567979 B1 | 3/2009 |
| WO | 9808191 A1 | 2/1998 |
| WO | 9905643 A2 | 2/1999 |
| WO | WO 0025265 A1 * 5/2000 ....... G06K 19/07749 |

OTHER PUBLICATIONS

International Search Report for corresponding International PCT Application PCT/EP2014/002938, dated Feb. 4, 2015.
Chinese Office Action from CN Application No. 201480059685.5, dated Feb. 6, 2018.

* cited by examiner

IC MODULE FOR DIFFERENT CONNECTION TECHNOLOGIES

BACKGROUND

This invention is directed to an IC module suitable for installation in a portable data carrier and being connected to an electronic device present in the data carrier. In particular, the invention is directed to an IC module for installation in a chip card in which an antenna coil is formed.

From EP 1 567 979 B1 is known an IC module which is inserted into a card body of a chip card and, upon insertion, connected to an antenna laid out in the card body. In the card body there is located for this purpose a recess in which contacting terminals of the antenna end. The module possesses module terminals corresponding to the antenna terminals. There is applied to the antenna terminals or the module terminals an elastic, conductive adhesive material in the form of a cone. The module is thereupon inserted into the recess under pressure, so that the conductive adhesive cones are deformed into flat cakes. There arises in this manner, without any further measures being required, an electrical pressure-form connection between the module terminals and the antenna terminals.

In practice it has proved expedient to design the module-side contacting areas in the form of a grid pattern with free areas which are framed by conducting tracks. The free areas consist of non-conductive module material and support the adhesive connection. Such contacting areas in the form of a grid pattern are naturally suitable only to a degree for making conventional soldered connections for attaching wires. Modules furnished with such contacting areas are therefore restricted to a certain connection technology.

From EP 1 654 694 B1 is further known an IC module provided for installation in a chip card and having two pairs of module terminals. One pair serves for attaching an antenna prepared in the card, the other for attaching a switch prepared in the card. The module is based on a so-called lead frame, i.e. on an originally cohesive large contact pad which has been subdivided by recesses into a multiplicity of elements. Four of said elements form the two pairs of module terminals. The electrical connection with the card-side device terminals is accordingly effected by means of the same connection technology, i.e.—in the case of lead frames—by soldering.

SUMMARY

The object of the invention is to improve a module set up for pressure-form connections so that it is also suitable for soldered connections.

This object is achieved by a module having the features of the main claim. The module according to the invention has the advantage of guaranteeing high contact reliability also for soldered connections by means of wires with little additional effort. This is attained by providing, besides the contact pads optimized for the pressure-form connection, an additional contact pad in each case which enables in particular solder terminals. Particularly preferably, the two different types of contacting pads are configured to be directly connected as a unit. Supplying the additional contact pad according to the invention has the advantage of being simply realized. The module furnished with two sets of contacting pads makes it possible to use the module for differently constructed data carriers. Since it is no longer necessary to supply each data-carrier type with its own module, the total manufacturing costs are reduced. In addition, manufacture is simplified. Furthermore, the additional contact pads have the advantage of increasing the connection reliability by expanding the connecting area, regardless of which connection technology is utilized.

BRIEF DESCRIPTION OF THE DRAWINGS

With reference to the drawing, an embodiment example of the invention will be described in more detail hereinafter. There are shown.

DETAILED DESCRIPTION OF VARIOUS EMBODIMENTS

Figure 1:
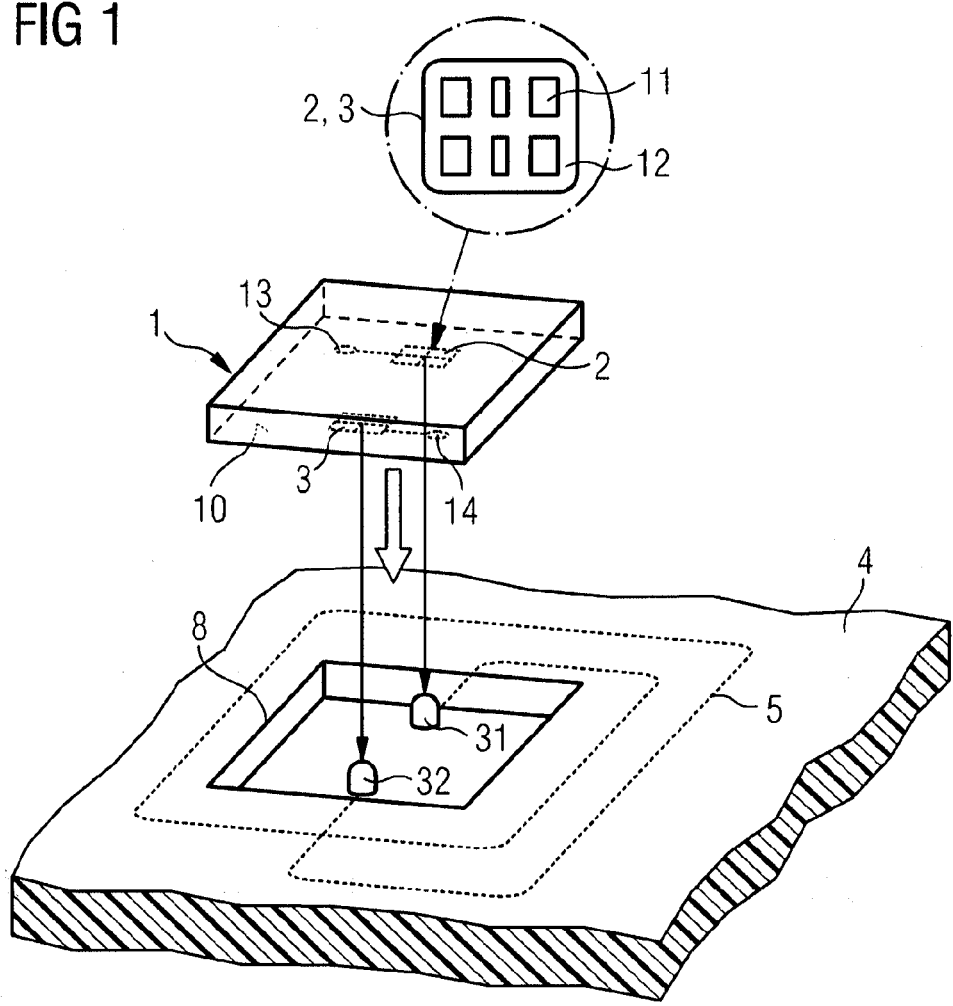
FIG. 1 a perspective oblique plan view of a module prior to installation in a data carrier by means of a first connection technology, FIG. 2 a view of the underside of a module, FIG. 3 a perspective oblique plan view of a module prior to installation in a data carrier using a second connection technology, FIG. 4 a design of contacting pads for different connection technologies in a common structure, FIG. 5 a design variant of contacting pads for different connection technologies in a common structure, FIG. 6 a further design variant of contacting pads for different connection technologies in a common structure, and FIG. 7 a perspective oblique plan view of a module prior to installation in a data carrier using a design variant for the contacting pads.

FIG. 1 shows a per se known IC module 1 which has on its underside 10 contacting elements in the form of two pairs of contacting pads 2, 3, 13, 14. The contacting pads 2, 3, 13, 14 serve to establish an electrical connection with an electronic device 5 formed in a data carrier 4. All the shown dimensions, in the other figures as well, are untrue to scale and serve only to illustrate the described principles.

The contacting pads 2, 3 are optimized for connections by the pressure-form technology. They are thus configured as structured contacting pads, as indicated in the enlargement. That is to say, they possess e.g. a structure in the form of a cross-grid pattern with free areas 11 which are enclosed by a conducting-track frame 12. The free areas 11 are expediently formed by the non-conductive basic material of the module body. They are somewhat set back against the raised conducting-track frame, typically by a few μm, and effectuate, through the minimal texturing, the formation of a large contact area across which charge can flow. In addition, they enter into good adhesive connections with mating contacting elements which contain an adhesive. Alternatively, the free areas 11 can themselves be constructed as a raised structure on the conductive material forming the conducting-track frame 12.

The contacting pads 13, 14 are optimized for solder-type connections by means of wires; they will be explained hereinafter with reference to FIGS. 2, 3.

Expediently, the IC modules 1, referred to hereinafter as modules, are supplied in a plastic-coated carrier band. The formation of the contacting pads 2, 3 and of all further conducting-track elements is expediently effected by etching technology.

The data carrier 4 is for example a card with standard dimensions according to ISO 7816. However, other sizes or other construction forms with completely different geometries are likewise possible. The data carrier 4 possesses a recess 8 which is matched to the construction form of the module 1. It is as a rule so designed that the upper side 9 of the module 1 forms a part of the surface of the data carrier 4 in the inserted state. In one embodiment, the module 1 can bear on its upper side 9 a galvanic contact pad.

In the data carrier 4 an electronic device 5 is formed. The device 5 can be e.g. an antenna, as indicated in FIG. 1. Other devices are likewise possible, for example a switch or a sensor. The device 5 possesses mating contacting elements which end in the recess 8. The mating contacting elements correspond to the module-side contacting pads 2, 3 and serve to connect the device 5 to the module 1.

In the example of FIG. 1, the mating contacting elements have the form of compressible conductive-material bumps 31, 32. Expediently, the material of the conductive-material bumps 31, 32 is slightly elastic and produces after a deformation a continual counterpressure. Advantageously, it additionally acts as an adhesive at the same time. The conductive-material bumps 31, 32 are matched to the structured module-side contacting pads 2, 3. They have e.g. the shape of pyramids, cone apexes, hemispheres, cylinders or similar heap shapes.

Upon installation of the module 1, the module-side structured contacting pads 2, 3 come to lie on the compressible conductive-material bumps 31, 32 in the recess 8 and compress them. The conductive-material bumps 31, 32 are thereby deformed to resemble flat cakes. They thus increase the connecting area available on the contacting pads 2, 3, which becomes a large conductive connecting area. There arises an accordingly highly conductive electrical connection between module 1 and electronic device 5. When the material of the conductive-material bumps 31, 32 at the same time has an adhesive effect, the connection is in addition very strong.

Figure 2:
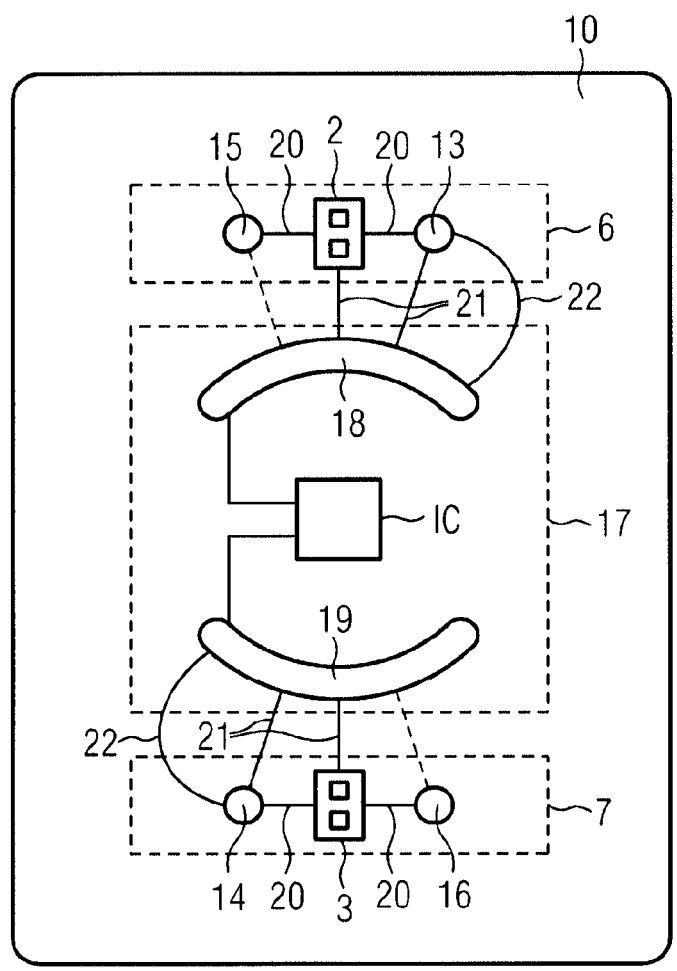

FIG. 2 shows a plan view of the underside 10 of a module 1. Formed on the underside 10 are contacting elements in the form of two contacting-pad blocks 6, 7 which consist of at least two differently designed contacting pads in each case. A first set of contacting pads is configured in the form of a pair of structured contacting pads 2, 3, as explained with reference to FIG. 1. A second set of contacting pads 13, 14 possesses the form of solder areas. The solder areas 13, 14 are enlarged conducting-track regions and possess approximately the same size as the structured contacting pads 2, 3. Via conducting-track elements 20 the solder areas 13, 14 are respectively connected to the structured contacting pads 2, 3.

Figure 4:
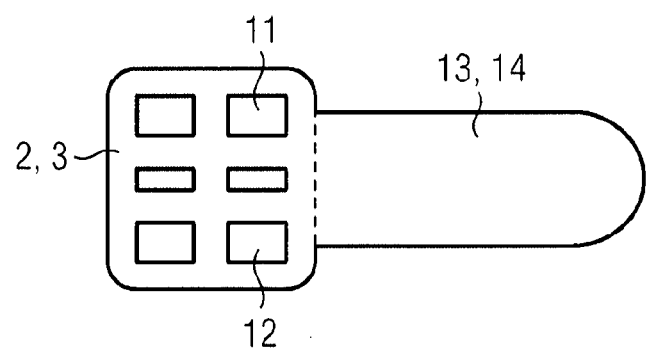

In a variant represented in FIG. 4, solder areas 13, 14 and structured contacting pads 2, 3 are configured as a common structure, the different contacting pads being interconnected without a transition. Conducting-track elements 20 are omitted here. In this example, the solder areas 13, 14 are respectively formed as a cone-like extension out of a side of the structured contacting pads 2, 3. The longitudinal extension of the cone-like extensions, i.e. of the solder areas 13, 14, corresponds approximately to the width of the structured contacting pads 2, 3. Other geometries are of course possible.

Figure 5:
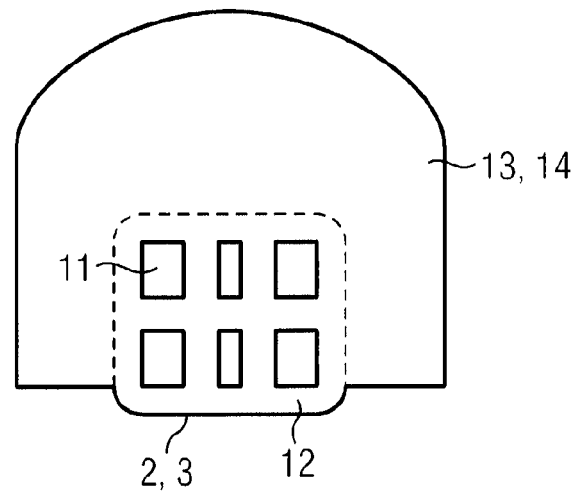

In the variant represented in FIG. 5, the solder areas 13, 14 are likewise configured as a common structure with the structured contacting pads 2, 3. However, the solder areas 13, 14 enclose the structured contacting pads 2, 3 on three sides in a horseshoe shape. The radial extension of the contacting-pad horseshoe corresponds approximately to the width of the structured contacting pads 2, 3.

Figure 6:
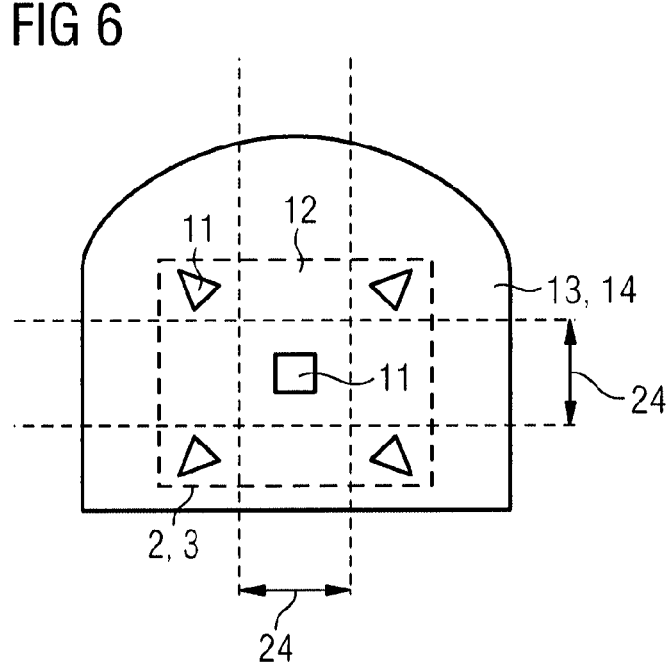

In the variant represented in FIG. 6, the solder areas 13, 14 likewise form a common structure with the structured contacting pads 2, 3. The solder areas 13, 14 completely enclose the structured contacting pads 2, 3 here, forming a solder-area ring 13, 14.

The free areas 11 of the structured contacting pads 2, 3 respectively comprise a central free area 11 which lies at the intersection point of two, expediently orthogonal, axes 24 through the contacting pad 2, 3, as well as further, outer free areas 11 which lie outside the axes 24. The axes 24 have the form of areal strips which determine a minimum distance between two opposing outer free areas 11. The width of the strips or of the axes 24 is expediently matched to those wire conductors or connection tasks that are typically utilized in connection with the module 1. It is preferably so dimensioned that the axis 24 can for example completely receive a wire conductor laid across the contacting pad 2, 3, which conductor then bears on the basic material of the module 1 over the central free area 11, and entirely on the contacting pads 2, 3 over the rest of the axis 24. In the bearing region the structured contacting pads 2, 3 can then likewise act as a solder area, and the wire conductor be connected to the contacting pad 2, 3 by soldering. The arrangement of the free areas 11 can be effected for example in the manner of the five on dice, as indicated in FIG. 6. The radial extension of the solder-area ring 13, 14 can be smaller than the width of the structured contacting areas 2, 3, since the strip formed by the axes 24 up to the central free area 11 is respectively likewise utilizable as a solder area.

The geometries of the solder-area ring 13, 14 and of the free areas 11 are designable within a broad framework. For example, the solder-area ring 13, 14, as indicated in FIG. 6, can have individual straight side edges or be configured entirely as a rectangular ring. The outer free areas 11 can be designed for example as triangles or in a kidney shape.

In the embodiment variant shown in FIG. 2, the contacting-pad blocks 6, 7 respectively have a further contacting pad 15, 16 which likewise possesses the form of a solder area. The further solder areas 15, 16 are configured as the mirror image of the first pair of solder areas 13, 14. They expediently possess the same or a similar geometry to the first pair of solder areas 13, 14 and are, like them, connected to the structured contacting pads 2, 3 via conducting-track elements 20.

It is possible to provide an even greater number of solder areas around the structured contacting pads 2, 3. Arrangement and number of the solder areas 13, 14, 15, 16 need not be distributed symmetrically over the structured contacting pads 2, 3. Also, the form of the solder areas 13, 14, 15, 16 can be varied within a wide framework. Besides point-symmetric and axisymmetric geometries, there might be used in particular free forms. Where possible, the solder areas 13, 14, 15, 16 can be formed out of the contacting pads 2, 3 always without a transition.

Furthermore, there is formed on the underside 10 a link system 17 which serves to couple the contacting pads 2, 3, 13, 14, 15, 16 to the IC of the module 1. The link system 17 consists of a pair of collecting bars 18, 19 from which conducting paths respectively extend to the contacting pads 2, 3, 13, 14, 15, 16. The coupling with the IC is effected e.g. via bonding wires. The layout of the link system 17 can, as indicated in FIG. 2, be based on a circle geometry and possess semicircular collecting bars 18, 19; arbitrary other geometries are of course likewise possible.

Preferably, the contacting pads 2, 3, 13, 14, 15, 16 are respectively connected to the link system 17 via at least two conducting paths. As a rule, at least the structured contacting pads 2, 3 are connected to the link system 17 via conducting-track elements 21 on a geometrically direct line, on the one hand, and via an additional redundant conducting path 22, on the other hand. The redundant conducting paths 22 increase the contacting reliability, regardless of whether the structured contacting pads 2, 3 or the solder areas 13, 14, 15, 16 are utilized. Expediently, each of the contacting pads 2, 3, 13, 14, 15, 16 is connected to the link system 17 directly via a conducting path.

In a variant of the contacting-pad arrangement indicated in FIG. 2, the structured contacting pads 2, 3 and the solder areas 13, 14, 15, 16 do not lie in a row side by side, but are arranged on opposing sides of the collecting bars of the link system 17.

The above-described module 1 permits the establishment of an electroconductive connection with mating contacting elements while employing different connection technologies: an electrical connection can be established by means of a pressure-form technology, on the one hand, and by soldering using connection wires 23, on the other hand. The module 1 can thus be used both in data carriers 4 whose mating contacting elements have the form of compressible conductive-material bumps and in data carriers 4 in which the mating contacting elements have the form of solder terminal areas. Upon installation in a module 1 only one set of contacting pads is respectively utilized, e.g. only the structured contacting pads 2, 3 or only a pair of solder areas 13, 14, 15, 16. The respective other set of contacting pads remains unutilized.

Figure 3:
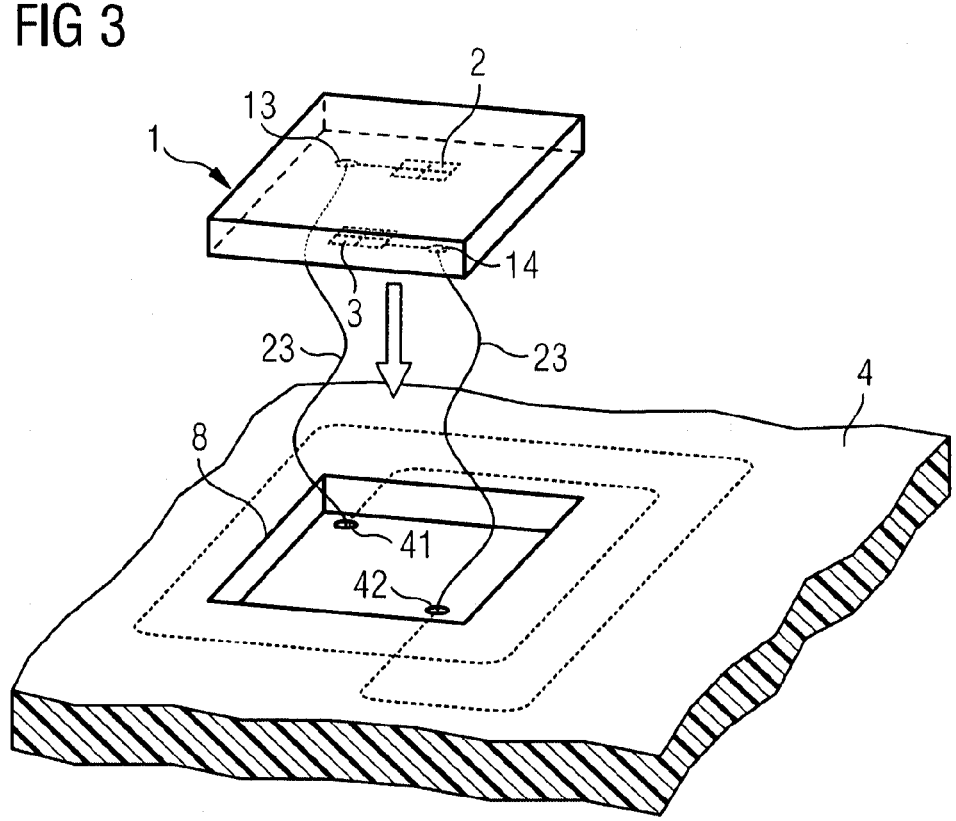

FIG. 3 illustrates an installation of a module 1 in a data carrier by which the structured contacting pads 2, 3 are not utilized for forming an electrical connection, but rather the contacting pads 13, 14 configured as solder areas.

The electronic device 5 is again an antenna coil. Its mating contacting elements are now configured as plane wire terminal areas 41, 42 which are arranged open in the recess 8. The connection between module 1 and antenna 5 is effected using connection wires 23 which are respectively soldered to a solder area 13, 14 and to corresponding wire terminal areas 41, 42. Establishing the electrical connection between module 1 and data carriers 4 is expediently effected in this constellation before the actual module installation takes place. The recess 8 is for this purpose so dimensioned and so designed that the connection wires 23 have room therein under the installed module 1. In a variant, the antenna 5 is configured in the form of a wire-wound coil. In this case, the wire terminal areas 41, 42 can be omitted. Instead, the ends of the antenna 5 are left open and directly form the connection wires 23.

Figure 7:
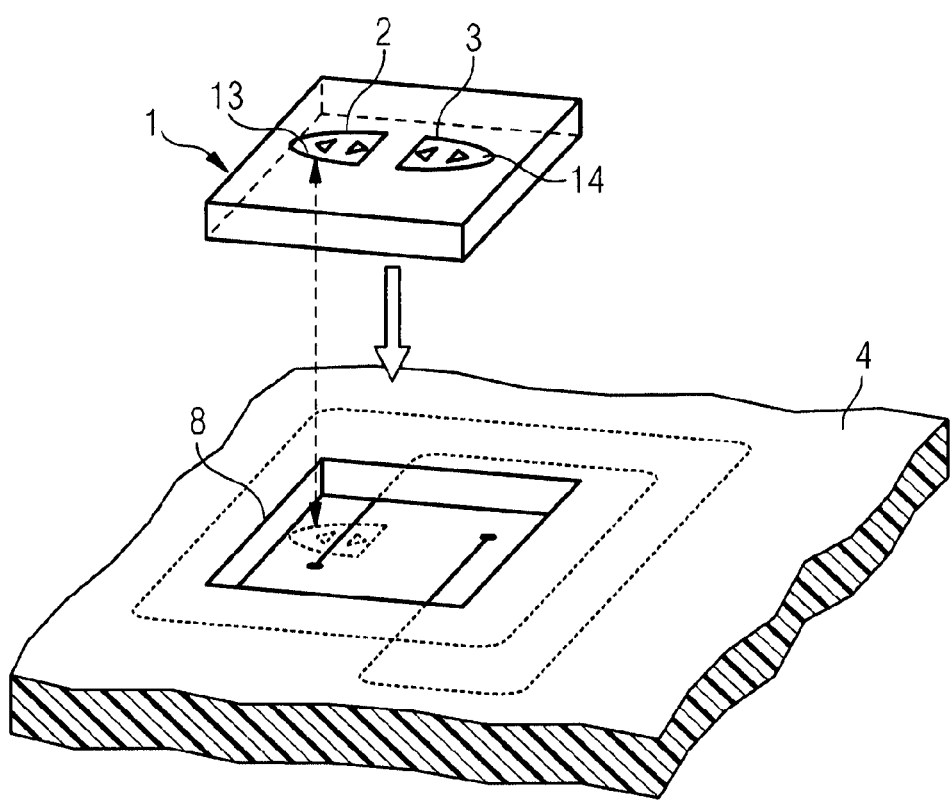

FIG. 7 illustrates an installation of a module 1 in a data carrier by which the solder areas 13, 14 form a common structure with the structured contacting pads 2, 3, as is illustrated in FIG. 6. The solder areas 13, 14 completely enclose the structured contacting pads 2, 3 and form a solder-area ring 13, 14, there being formed between the free areas 11 of the structured contacting pads 2, 3 axes 24 which can additionally be employed as a solder area; the design of the free areas 11 and of the structured contacting pads 2, 3 is indicated in simplified form.

The electronic device 5 is again an antenna coil. The mating contacting elements are now simply configured as wire ends which are arranged open in the recess 8 and form the connection wires 23. The connection between module 1 and antenna 5 is effected by connecting the wire ends directly to the module 1, i.e. soldering them respectively to a solder area 13, 14. In the recess 8 the meeting of a solder area with a wire end is illustrated. The wire ends of the antenna coils meet the solder areas 13, 14 longitudinally in this embodiment example.

While maintaining the basic idea of furnishing an IC module with a plurality of sets of contacting pads for different connection technologies, the solution according to the invention permits a number of further embodiments and variants which will not be dealt with here in detail. Instead of the described connection technologies, i.e. the pressure-form technology and the wire-soldering technology, different or further connection technologies can be enabled by further, accordingly adapted contacting pads. For example, in addition or as an alternative to one of the above-mentioned connection technologies there can be provided a connection that requires an external excitation, e.g. by IR radiation. Corresponding contacting pads can then e.g. be covered with an activatable material. The layout for the contacting pads 2, 3, 13, 14, 15, 16, the link system 17 and the conducting paths is further designable within a broad framework. Further, the link system 17 can in principle also be omitted. The contacting-pad blocks 6, 7 are then connected directly to the IC of the module 1.

LIST OF REFERENCE SIGNS

1. IC module
2. Structured contacting pad
3. Structured contacting pad
4. Data carrier
5. Electronic device (antenna)
6. Contacting-pad block
7. Contacting-pad block
8. Recess
9. Upper side of module
10. Underside of module
11. Free areas
12. Conducting-track frame
13. Contacting pad (solder area)
14. Contacting pad (solder area)
15. Contacting pad (solder area)
16. Contacting pad (solder area)
17. Link system
18. Collecting bar
19. Collecting bar
20. Conducting-track element
21. Conducting-track element
22. Redundant conducting path
23. Connection wires
24. Axis (strip)
31. Conductive-material bump
32. Conductive-material bump
41. Wire terminal area
42. Wire terminal area

The invention claimed is:

1. An integrated circuit (IC) module for installation in a portable data carrier having:
    an upper side which, in the installed state, forms a part of the surface of the data carrier, and
    contacting elements for establishing an electrical connection with mating contacting elements which are configured open in a recess in the data carrier,
        wherein the contacting elements have at least a first set of contacting pads for a first connection technology and at least a second set of contacting pads for a second connection technology,
        wherein a contacting pad of the first set of contacting pads in each case is electroconductively connected to a contacting pad of the second set of contacting pads, and wherein the contacting pads of the second set of contacting pads are respectively configured in the form of a closed or open ring around the first set of contacting pads, which forms a unit with a conducting-track frame.

2. The module according to claim 1, wherein the contacting pads of the first set of contacting pads are structured contacting pads and form a pattern with free areas which are framed by a frame consisting of conducting tracks to support electrical connections with mating contacting elements which are supplied in the form of conductive-material bumps.

3. The module according to claim 1, wherein the contacting pads of the second set of contacting pads are solder areas to enable electrical connections using connection wires which are connected to the solder areas, on a first end of the connection wires, and to mating contacting elements, on a second end of the connection wires.

4. The module according to claim 1, wherein the contacting pads of the second set of contacting pads are directly connected to the contacting pads of the first set of contacting pads.

5. The module according to claim 1, wherein a free area of the first set of contacting pads is arranged at an intersection point of two strip-shaped axes, and all further free areas outside the axes.

6. The module according to claim 1, wherein the mating contacting elements are configured as wire terminal areas.

7. The module according to claim 1, wherein the IC module has at least one link system which is connected to the IC of the module, on a first end, and to at least one contacting pad, on a second end.

8. A method for manufacturing a portable data carrier having an integrated circuit (IC) and an electronic device having the steps of:
supplying an IC module according to claim 1,
supplying a portable data carrier having a recess prepared for receiving the IC module and having an electronic device formed in the data carrier and connected to mating contacting elements prepared in the recess,
inserting the IC module into the recess in the data carrier, wherein
upon insertion of the IC module one of the sets of contacting pads is connected to the prepared mating contacting elements by means of the appurtenant connection technology.

9. A system that is installable in a portable data carrier, comprising:
an upper side which, in the installed state, forms a part of the surface of the data carrier, and
contacting elements for establishing an electrical connection with mating contacting elements which are configured open in a recess in the data carrier,
wherein the contacting elements have at least a first set of contacting pads for a first connection technology and at least a second set of contacting pads for a second connection technology,
wherein a contacting pad of the first set of contacting pads in each case is electroconductively connected to a contacting pad of the second set of contacting pads, and
wherein the contacting pads of the second set of contacting pads are respectively configured in the form of a closed or open ring around the first set of contacting pads, which forms a unit with a conducting-track frame.

10. The system of claim 9, wherein the mating contacting elements have the form of compressible conductive-material bumps.

11. The system of claim 10, wherein the conductive-material bumps are at least partially elastic.

12. The system of claim 11, wherein the at least partially elastic conductive-material bumps produce a continual counterpressure after a deformation.

13. The system of claim 10, wherein the first set of contacting pads lies on the compressible conductive-material bumps.

14. The system of claim 10, wherein the compressible conductive-material bumps form flat cakes that increase the connecting area available on the first set of contacting pads.

15. An integrated circuit (IC) module for installation in a portable data carrier having:
an upper side which, in the installed state, forms a part of the surface of the data carrier, and
contacting elements for establishing an electrical connection with mating contacting elements which are configured open in a recess in the data carrier,
wherein the contacting elements have at least a first set of contacting pads for a first connection technology and at least a second set of contacting pads for a second connection technology,
wherein a contacting pad of the first set of contacting pads in each case is electroconductively connected to a contacting pad of the second set of contacting pads,
wherein the contacting pads of the first set of contacting pads are structured contacting pads and form a pattern with free areas which are framed by a frame consisting of conducting tracks to support electrical connections with mating contacting elements which are supplied in the form of conductive-material bumps.

* * * * *